US008407091B2

(12) United States Patent
Baluja (10) Patent No.: US 8,407,091 B2
(45) Date of Patent: Mar. 26, 2013

(54) OPTIMIZING PLACEMENT AND DELIVERY OF ADVERTISEMENTS (75) Inventor: Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/494,214

(22) Filed: Jun. 12, 2012

(65) Prior Publication Data

US 2012/0253922 A1 Oct. 4, 2012

Related U.S. Application Data (63) Continuation of application No. 13/442,509, filed on Apr. 9, 2012, which is a continuation of application No. 10/986,440, filed on Nov. 10, 2004, now Pat. No. 8,170,913.

(51) Int. Cl.
*G06Q 30/00* (2012.01)
*G06Q 99/00* (2006.01)

(52) U.S. Cl. .................................. 705/14.43; 705/14.42

(58) Field of Classification Search ............... 705/14.42, 705/14.43
See application file for complete search history.

(56) References Cited

U.S. PATENT DOCUMENTS

| 5,724,521 | A | 3/1998 | Dedrick |
| 5,933,811 | A | 8/1999 | Angles et al. |
| 5,937,392 | A | 8/1999 | Alberts |
| 6,314,451 | B1 | 11/2001 | Landsman et al. |
| 6,941,301 | B2 | 9/2005 | Ferguson et al. |
| 7,130,808 | B1 | 10/2006 | Ranka et al. |
| 7,143,075 | B1 | 11/2006 | Chickering et al. |
| 7,363,302 | B2 | 4/2008 | Lester |
| 7,406,434 | B1 * | 7/2008 | Chang et al. ............... 705/14.43 |
| 7,415,423 | B2 | 8/2008 | Ranka et al. |
| 7,472,102 | B1 | 12/2008 | Heckerman et al. |
| 7,895,077 | B2 * | 2/2011 | Anand et al. ............... 705/14.42 |
| 2002/0184088 | A1 | 12/2002 | Rosenberg |
| 2003/0149938 | A1 | 8/2003 | McElfresh et al. |
| 2003/0177490 | A1 | 9/2003 | Hoshino et al. |
| 2004/0044571 | A1 | 3/2004 | Bronnimann et al. |
| 2004/0133469 | A1 | 7/2004 | Chang |
| 2004/0225562 | A1 | 11/2004 | Turner |

OTHER PUBLICATIONS

M.G. DeKimpe, D.M. Hanssens, Department Toegepaste Economische Wetenschappen, Onderzoeksrapport NR 9671, "Sustained Spending and Persistent Response: A New Look at Long-Term Marketing Profitability", [online] 1996; Retrieved Internet electronic mail: https://lirias.kuleuven.be/bitstream/123456789/118913/1/or_9671.pdf.

M.G. DeKimpe, D.M. Hanssens "Sustained Spending and Persistent Response: A New Look at Long-Term Marketing Profitability", Nov. 12, 1996; JSTOR: Journal of Marketing Research, vol. 36, No. 4 (Nov. 1999), pp. 397-12, Abstract, 3 pages.

* cited by examiner

*Primary Examiner* — John Weiss
*Assistant Examiner* — Marilyn G MacAsiano
(74) *Attorney, Agent, or Firm* — Fish & Richardson P.C.

(57) ABSTRACT

The efficient allocation of advertisements, also known as creatives, on one or more web sites is provided for while ensuring that guarantees to advertisers are honored. In one embodiment, a linear program solver allocates creatives to advertising slots according to an optimizing function designed to maximize revenue for the site. The linear program solver takes as input a set of creatives, creative performance data, constraints, and slot identifiers. The output of the linear program solver is an optimized schedule not violative of any of the input constraints.

27 Claims, 3 Drawing Sheets

OPTIMIZING PLACEMENT AND DELIVERY OF ADVERTISEMENTS

CROSS-REFERENCE TO RELATED APPLICATIONS

This application is a continuation application of, and claims priority to, U.S. patent application Ser. No. 13/442,509, entitled OPTIMIZING PLACEMENT AND DELIVERY OF ADVERTISEMENTS, to inventor Shumeet Baluja, which was filed on Apr. 9, 2012 and is a continuation of U.S. patent application Ser. No. 10/986,440 (issued as U.S. Pat. No. 8,170,913 on May 1, 2012), entitled OPTIMIZING PLACEMENT AND DELIVERY OF ADVERTISEMENTS, to inventor Shumeet Baluja, which was filed on Nov. 10, 2004. The disclosure of each of the foregoing applications is incorporated herein by reference in its entirety.

BACKGROUND OF THE INVENTION

1. Field of the Invention

The present invention relates generally to inserting advertisements in web pages, or more generally any medium in which ad performance can be measured and quantified. In particular, the present invention is directed towards determining an optimal allocation of advertisements in response to specified objectives and constraints.

2. Description of the Related Art

Web site advertising has traditionally included a variety of models. In one model, known as an auction model, advertisers bid for space on a web site. In the auction model, an advertising space, also known in the art as an impression, is given to the highest bidder (or bidders). In another model, called a guarantee model, the site guarantees a certain number of impressions to an advertiser in exchange for a fixed fee. The guarantee model also supports additional arrangements—for example, a site can guarantee that an impression will receive a minimum number of clicks, or will result in a minimum number of transactions.

The number of impressions available on a site is known as the site's inventory. Inventory is traditionally hard to precisely measure because of difficulties in estimating site traffic, since the amount of traffic on a site can be highly variable, and hence the number of impressions available in the future is unknown. In addition, available inventory is hard to track because of the existence of guarantee-based contracts. Consider the following example, which illustrates the difficulty of tracking inventory. Assume that a site has five keywords in its inventory of slots to which impressions can be allocated. Assume also that the site charges an advertiser a first amount for each impression and a second amount for each click on that impression. Assume the following amounts for four clients:

Client A pays $0.25 for clicks on keywords 1, 2 and 3, and $0.05 for each displayed impression. Client 1 has been guaranteed 10,000 impressions.

Client B pays $0.35 for clicks on keywords 2, 3 and 4, and $0.10 for each displayed impression. Client 2 has been guaranteed 15,000 impressions.

Client C pays $0.85 for clicks on keywords 2 and 4, and $0.05 for each displayed impression. Client 3 has been guaranteed 5,000 impressions.

Client D pays $0.05 for clicks on keywords 1 and 3, and $0.02 for each impression. Client 4 has been guaranteed 15,000 impressions.

Now assume that a potential client, client E, is willing to pay $0.20 for clicks on keywords 1 and 5, and is willing to pay $0.02 for each impression. Client E demands a guarantee of 11,000 impressions. The site has estimated its inventory of keyword 5 at 6,000 impressions, and inventory of keyword 1 as 4,000 impressions.

To determine whether accepting the contract with client E is possible, the site operator must determine whether an additional 1,000 impressions can be delivered for keywords 1 and 5 by shifting the existing allocation of keywords and not violating any guarantees made to the other advertisers. As the number of advertisers, keywords and guarantees grows, this problem becomes increasingly complex. Accommodating even a single new advertiser may necessitate the rescheduling of hundreds or even thousands of other advertisers (and their associated creatives) due to a ripple effect caused by moving one advertiser's allocation, which then causes another advertiser's allocation to be moved, etc.

There is therefore a need in the art for an efficient way to allocate advertising impressions across a web site while maximizing revenue for the site and honoring guarantees made to advertisers.

SUMMARY OF THE INVENTION

The present invention enables efficient allocation of advertisements, also known as creatives, on one or more web sites, while ensuring that guarantees to advertisers are honored. In one embodiment, a linear program solver allocates creatives to advertising slots according to an optimizing function designed to maximize revenue for the site. In one embodiment, the linear program solver takes as input a set of creatives, creative performance data, constraints, and slot identifiers. Creative performance data includes data about each creative, and preferably its performance characteristics with respect to various slots. Constraints specify rules about which creatives can appear in which slots, how much revenue can be derived from creatives in different slots, how much an advertiser can be charged, etc., as detailed more fully below. The output of the linear program solver is an optimized schedule, which is determined according to an optimization function, and which is not violative of any of the input constraints. Note that accepting new contracts, although seemingly sources of additional revenue, can in fact decrease the total amount of money obtained because of moving better-performing advertiser contracts.

The present invention also enables more intelligent decision making about advertising allocation—in addition to determining whether a contract can be accommodated, the present invention helps to determine whether a contract should be accommodated. This analysis involves comparing an optimal allocation without the potential contract to an optimal allocation with the potential contract to determine which is more profitable. In this manner, the site operator can decide whether to accept a new contract, or maintain a current set of contracts.

The present invention also enables a site operator to favor one advertiser over another and still determine valid, non-violative allocations, as well as enabling efficient determination of operating statistics, such as how much of a particular inventory is available for sale at a particular time.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
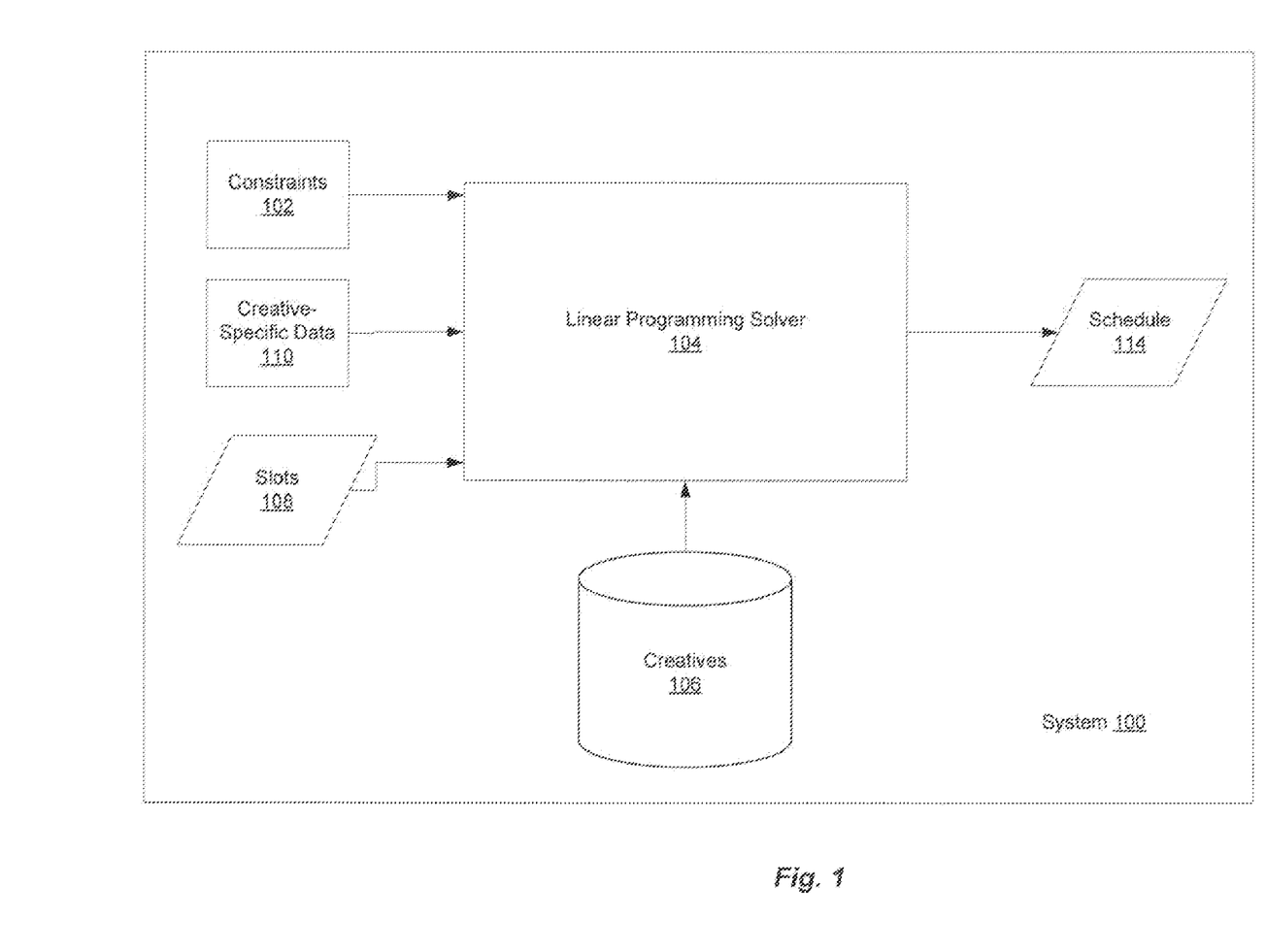
FIG. 1 is a block diagram of a system in accordance with an embodiment of the present invention.

FIG. 1 illustrates an example of a system 100 in accordance with an embodiment of the present invention. System 100 includes a linear program solver 104, which takes as inputs a set of constraints 102, slots data 108, creative-specific data 110, and creatives 106. Linear program solver 104 uses the inputs to determine its output, which is preferably a valid schedule 114. A valid schedule 114 is a schedule that satisfies all of the constraints 102.

A goal of system 100 is to maximize revenue for a site by scheduling available creatives 106 in available slots 108, subject to specified constraints 102. To understand how this goal is achieved by system 100, we begin by providing some terms useful in the describing the scheduling algorithm.

A slot 108 is a target to which a creative 106 can be assigned, i.e. a place where an advertisement can appear. For example, if a site serves 30 billion pages in a day and shows an average of three advertisements per page, there are 90 billion slots available per day. A slot 108 can be a keyword; a banner ad; an ad in a list of search results; a location on a web page, e.g., lower left corner; an entire site; etc. In addition, a slot can also be associated with a time or location. So, for example, a slot might be "any search for the keyword 'aviation' performed between 9:00 PM and 10:00 PM." The implementation of a particular slot scheme is not material to the present invention; it is sufficient that there are slots available to which creatives can be assigned.

A slot can be implemented in a variety of ways. For example, a slot can be semantically targeted keywords, site-position targeted, e.g. banners that always appear within the sports section of an on-line newspaper, demographically-targeted, e.g. a slot seen often by 19-24 year olds, geographically-related, e.g. a slot for cities with a population greater than 90,000, or time-related, e.g., a slot for advertisements that are delivered between 9:00 AM and 1:00 PM on weekdays.

The function $I(i, j)$ represents a payment than an advertiser is willing to make for placing its creative j in slot i—that is, for each impression of creative j in slot i.

The function $C(i, j)$ represents a payment that an advertiser is willing to make for each click on a creative j in slot i—that is, the cost-per-click for creative j in slot i.

The function $T(i, j)$ represents a payment that an advertiser is willing to make for each transaction arising from a click on a creative j in slot i.

The function $CTR(i, j)$ represents an expected click-through rate for creative j in slot i. For example, if 5% of visitors click on creative j when it is located in slot i, then $CTR(i, j)=0.05$.

The function $FTR(i, j)$ represents an expected transaction rate for creative j in slot i. For example, if 1% of visitors click on creative j located in slot and then subsequently buy a product, $FTR(i, j)=0.01$.

The function $Inv(i)$ represents the available inventory of slot i.

The function $A(i, j)$ represents a percentage of slot i to which creative j is assigned.

Constraints

Linear program solver 104 takes as input a variety of constraints 102 that should not be violated in determining optimum advertisement allocation. The following constraints 102 are included in a preferred embodiment.

As noted above, $Inv(i)$ represents the available inventory of slot i, and $A(i, j)$ represents the percentage of impressions of slot i occupied by creative j. Therefore, for each slot i and for n creatives $\{j_1, j_2, \ldots, j_n\}$, a constraint is $$\sum_{k=1}^{n} [A(i, j_k) \cdot Inv(i)] \leq Inv(i).$$

This ensures that the total percentage of slot i that is allocated is never greater than 100%, though it may be less. If it is less than 100%, inventory is still available for slot i.

Next, in a preferred embodiment an advertiser can choose a selection of slots in which a creative should or should not appear. If creative-specific data 110 indicates that a creative is not supposed to appear in a slot, then a constraint 102 is preferably added by system 100 to ensure that it does not. Mathematically, if a creative j cannot be placed in slot i, then linear program solver 104 sets $A(i, j)=0$.

In addition, an advertiser's budget should not be exceeded. The amount paid by an advertiser depends on the number of impressions shown as well as the pricing scheme for each impression. In a preferred embodiment, advertisers are charged either by number of impressions displayed, number of impressions clicked on, or number of transactions completed. Mathematically, the amount spent by an advertiser on a slot i is:

$$\sum_{k=1}^{n} A(i, j_k) \cdot Inv(i) \cdot I(i, j_k) + A(i, j_k) \cdot Inv(i) \cdot CTR(i, j_k) \cdot C(i, j_k) +$$
$$A(i, j_k) \cdot Inv(i) \cdot FTR(i, j_k) \cdot T(i, j_k)$$

where $\{j_1, j_2, \ldots, j_n\}$ is the set of the advertiser's n creatives. Thus, the constraint here is that the amount spent by an advertiser across all slots is less than a maximum amount.

Another constraint that may be present in a preferred embodiment is a guaranteed number of impressions. That is, the site operator may guarantee to an advertiser that one or more of its creatives will receive a minimum number of impressions associated with a slot. In that case, for a given slot i and a given creative j, the following constraint applies:

$$A(i,j) \cdot Inv(i) \geq Min\_impressions\_guaranteed.$$

If, instead of a single creative being guaranteed a minimum number of impressions, a set of n creatives is given the guarantee, the constraint becomes:

$$\sum_{k=1}^{n} [A(i, j_k) \cdot Inv(i)] \geq \text{Min\_impressions\_guaranteed}.$$

Similarly, for a guaranteed number of clicks instead of impressions, the constraint is:

$$\sum_{k=1}^{n} [A(i, j_k) \cdot Inv(i) \cdot CTR(i, j_k)] \geq \text{Min\_clicks\_guaranteed};$$

and for a guaranteed number of transactions, the constraint is:

$$\sum_{k=1}^{n} [A(i, j_k) \cdot Inv(i) \cdot FTR(i, j_k)] \geq \text{Min\_transactions\_guaranteed}$$

In one embodiment, a constraint ensures that a minimum percentage of a slot is allocated to a set of creatives. This is useful, for example, if an advertiser wants to saturate the market with its ads such as might be the case during a new product launch. For a set of n creatives $\{j_1, j_2, \ldots, j_n\}$ to be allocated a minimum percentage of slot i, the constraint is:

$$\sum_{k=1}^{n} [A(i, j_k) \cdot Inv(i)] \geq \text{Guaranteed\_Percentage} \cdot Inv(i).$$

As will be appreciated by those of skill in the art, other constraints can be enforced according to the requirements of an advertiser or the site operator.

Linear Optimization

The linear program solver 104 attempts to maximize or minimize an optimization function subject to constraints 102 such as those described above. In one embodiment, the optimization function maximizes immediate site revenue, i.e. revenue from all advertisers for current contracts. Given the constraints 102 and the creative-specific data 110 (including expected click-through rate and transaction rate, if needed) of each of n creatives for each m slots, the revenue function to be maximized is:

$$\sum_{s=1}^{m} \sum_{k=1}^{n} A(i_s, j_k) \cdot Inv(i_s) \cdot I(i_s, j_k) + A(i_s, j_k) \cdot Inv(i_s) \cdot CTR(i_s, j_k) \cdot C(i_s, j_k) +$$
$$A(i_s, j_k) \cdot Inv(i_s) \cdot FTR(i_s, j_k) \cdot T(i_s, j_k)$$

Consider an example in which there is only advertiser, Acme Car Co. Acme is considering purchasing advertisements on a site under the keywords listed in Table 1. In Table 1, each keyword also has an associated number of impressions available. That is, an inventory (available impressions) is listed for each slot (keyword):

TABLE 1

| Slot (Keyword) | Inventory (Impressions) |
| --- | --- |
| Autos--Car | 2,000,000 |
| Autos--Truck | 150,000 |

TABLE 1-continued

| Slot (Keyword) | Inventory (Impressions) |
| --- | --- |
| Autos--SUV | 500,000 |
| Autos--Pickup | 100,000 |
| Autos--Used | 700,000 |

Acme is considering deploying two creatives. The first, "Acme-General" is targeted towards the general market, the second, "Acme-Young" is targeted towards the youth market. Acme specifies certain creative-specific data 110. For example, Acme agrees to spend $15,000, and is willing to pay $5.00 per 1,000 impressions. Acme demands a guarantee of at least 125,000 impressions. Furthermore, at least 50% of their cost must be spent on the keyword "Autos-Car"; no more than 20% of their cost may be spent for "Autos-SUV"; and no more than 10% of their cost may be spent for "Autos-Used."

Linear program solver 104 takes as input the creative-specific data 110. As described above, creative-specific data preferably includes expected performance data about each creative in each slot, and additionally includes permitted uses of the creative, e.g., which slots the creative can go in, which are then translated into constraints by system 100. Continuing with the Acme example, assume the following performance metrics for the two creatives and the five slots:

TABLE 2

| Slot | Creative | Expected Clicks per 100 Impressions |
| --- | --- | --- |
| Autos-Car | Acme-General | 2.5 |
| Autos-Truck | Acme-General | 1.0 |
| Autos-Suv | Acme-General | 2.0 |
| Autos-Pickup | Acme-General | 1.5 |
| Autos-Used | Acme-General | 3.8 |
| Autos-Car | Acme-Young | 2.2 |
| Autos-Truck | Acme-Young | 1.3 |
| Autos-Suv | Acme-Young | 1.4 |
| Autos-Pickup | Acme-Young | 1.0 |
| Autos-Used | Acme-Young | 0.9 |

Thus, according to Table 2, the "Acme-Young" creative is expected to receive a click 2.2% of the time it appears as in impression in the "Autos-Car" slot.

Given this information linear program solver 104 determines an optimal allocation schedule. Using the sample data shown above, in a preferred embodiment linear program solver 104 can provide the following summary data listed in Table 3:

TABLE 3

| | |
| --- | --- |
| Total Revenue | 15,000 |
| Total Impressions Inventory | 3,450,000 |
| Total Impressions Inventory Sold | 3,000,000 |
| Total Clicks | 74,200 |
| Contractually Guaranteed Clicks | 0 |
| Contractually Guaranteed Impressions | 125,000 |
| Total Impressions Unsold | 450,000 |
| Total Revenue Forfeited | 0 |
| Num Clients | 1 |
| Num Contracts | 1 |
| Num Creatives | 2 |
| Num Placements in Site | 5 |
| Average CTR | 2.15% |
| Average Impression Worth (×1000) | $ 4.35 |
| Average Click-Through Worth | $ 0.20 |
| Average Spend per Client | $ 15,000 |

TABLE 3-continued

| | |
|---|---:|
| Average Impressions Per Client | 3,000,000 |
| Average Clicks Per Client | 74,200 |

In the example of Table 4, the total revenue is $15,000. The total inventory of impressions is 3,450,000, of which 3,000,000 have been sold, and 450,000 remain unsold. The total number of clicks on the impressions was 74,200. No clicks were contractually guaranteed, but 125,000 impressions were guaranteed. Since more than 125,000 impressions were provided, no revenue was forfeited. The total number of clients in the example of Table 4 is 1, and the total number of contracts is also 1. Two creatives were available, and they were placed five times in the site. The average click-through-rate was 2.15%. Based on these numbers, the average impression worth was $4.35 for 1000 impressions, the average click-through worth was $0.20, the average spend per client was $15,000, the average impressions per client was 3,000,000, and the average number of clicks per client was 74,200.

As can be seen from Table 4 below, linear program solver 104 has allocated the "Acme-General" creative to fill most of the available impressions inventory. This is consistent with Acme-General having a higher click-through-rate than the Acme-Young creative for each keyword other than Autos-Truck.

TABLE 4

| Name | Client | Total Revenue | Impressions (×1000) | Clicks | CTR | MAX-CTR | MIN-CTR |
|---|---|---|---|---|---|---|---|
| Acme-General | Acme | $14,500 | 2,900 | 72,900 | 2.51 | 3.8 | 1.5 |
| Acme-Young | Acme | $   500 | 100 | 1300 | 1.3 | 1.3 | 1.3 |

In fact, as can be seen from the data in Table 5, the Acme-Young creative appears only in the Autos-Truck slot:

TABLE 5

Creative Data For Acme-Young

| Position | Impressions | Clicks | CTR-RATE | Revenue |
|---|---|---|---|---|
| autos-truck | 100,000 | 1,300 | 1.3 | 500 |

With a click-through-rate of only 1.3, it might at first seem counterintuitive for linear program solver 104 to place the Acme-young creative at all. However, consider the data in Table 6, which summarizes the allocation of each slot:

TABLE 6

| Slot | Total Revenue | Unsold Inventory | Dollars Per Click | Dollars Per 1000 Impressions |
|---|---|---|---|---|
| Autos-Car | $10,000.00 | sold-out | 0.20 | 5 |
| Autos-Pickup | $500.00 | sold-out | 0.33 | 5 |
| Autos-Suv | $2,500.00 | sold-out | 0.25 | 5 |
| Autos-Truck | $500.00 | 50,000 | 0.38 | 5 |
| Autos-Used | $1,500.00 | 400,000 | 0.13 | 5 |

Once the linear program solver 104 fills Autos-Car, Autos-Pickup, and Autos-Suv, it must choose between autos-truck and autos-used for the next placement. Revenue would be maximized by putting the Acme-General ad in the Autos-Used slot, which has a CTR of 3.8. However, one of the initial constraints listed in the contract specifies that no more than 10% of the advertiser's total expenditure, i.e. $15,000, can be in the Autos-Used category. The next-best option is to allocate the Acme-Youth creative to the autos-truck slot, which explains the schedule returned by linear program solver 104.

Figure 2:
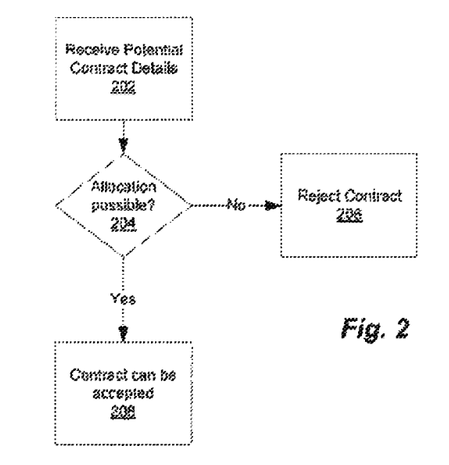
FIG. 2 is a flow chart illustrating a method for determining whether an advertising contract can be accommodated in accordance with an embodiment of the present invention.

Given an existing optimization, a site owner may want to know whether an additional contract can be accommodated. For example, an advertiser may wish to place a new contract order, or a salesperson might want to know whether to propose a contract to an advertiser. If the contract cannot be accommodated, then it should preferably not be offered or accepted. Referring to FIG. 2, using the optimization function defined above, the question can be answered. System 100 receives 202 data describing the potential contract, including creatives, guarantees and any additional constraints. Linear program solver 104 then attempts to create a schedule 114 from the existing contracts and including the newly received potential contract. If 204 a valid schedule 114 can be created—that is, all guarantees can be met and no other constraints are violated—then the contract can be accepted 208. If not, the contract must be rejected 206.

Figure 3:
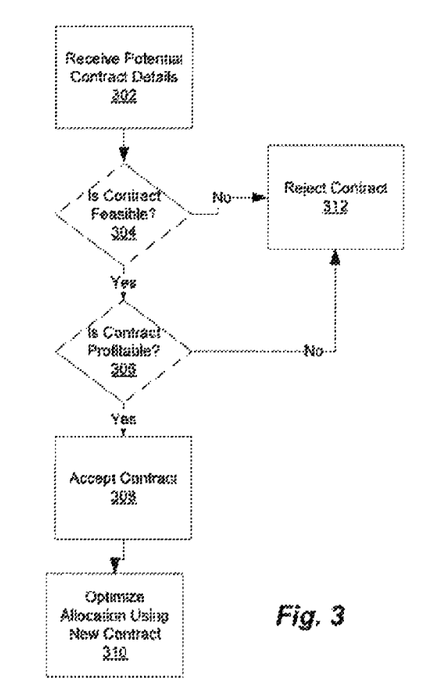
FIG. 3 is a flow chart illustrating a method for determining whether to accept an advertising contract in accordance with an embodiment of the present invention.

Just because a new contract can be accommodated, however, does not mean that it is to the site owner's benefit to do so. For example, consider a situation in which a proposed contract specifies a higher cost-per-click than an existing contract, though the proposed contract actually has a lower click-through rate. If the new contract is accepted and displaces some creatives associated with the old contract, revenue might actually decrease for the site owner. Conventionally, this loss of revenue would be very difficult to determine simply by examining the contract manually. However, the answer can be obtained using linear program solver 104 according to the present invention. By comparing the expected revenue without the new contract with the expected revenue including the new contract, the site operator can determine which is the more profitable option. FIG. 3 provides a flowchart illustrating the steps for determining whether to accept a new contract in accordance with an embodiment of the present invention. First, potential contract details are received 302 by linear program solver 104. Linear program solver 104 determines 304 whether the contract is feasible—that is, whether a valid schedule 114 can be determined. If not, then the contract is rejected 312 by system 100. If so, then system 100 determines whether 306 the contract increases the revenue to the site owner. If not, then the contract is rejected 312 by system 100. If it is profitable, then the contract is accepted 308 by system 100, and it is allocated 310 according to the schedule 114 optimized by linear program solver 104.

For example, suppose now that Beta Company would like to make two contracts with the site. In the first contract, Beta would like to pay for clicks, not impressions. Specifically, they are willing to pay $1.20 per click, up to a maximum spend of $10,000, and they demand a guarantee of 2000 clicks. The creative can be placed anywhere in the Autos category—any subcategory is acceptable.

The second Beta contract specifies a payment of $4.00 for each 1,000 impressions, up to a maximum spend of $25,000, and a guarantee of 555,555 impressions. In addition, less than 17% can be spent on Autos-Used, and nothing may be spent on Autos-Suv.

Table 7 lists the estimated click through rate of the previous Acme creatives and in addition includes the Beta creatives:

TABLE 7

| Slot | Creative | Expected Clicks per 100 Impressions |
| --- | --- | --- |
| Autos-Car | Acme-General | 2.5 |
| Autos-Truck | Acme-General | 1.0 |
| Autos-Suv | Acme-General | 2.0 |
| Autos-Pickup | Acme-General | 1.5 |
| Autos-Used | Acme-General | 3.8 |
| Autos-Car | Acme-Young | 2.2 |
| Autos-Truck | Acme-Young | 1.3 |
| Autos-Suv | Acme-Young | 1.4 |
| Autos-Pickup | Acme-Young | 1.0 |
| Autos-Used | Acme-Young | 0.9 |
| Autos-Car | Beta-HardSell | 1.8 |
| Autos-Truck | Beta-Hardsell | 1.9 |
| Autos-Suv | Beta-Hardsell | 2.1 |
| Autos-Pickup | Beta-Hardsell | 0.6 |
| Autos-Used | Beta-Hardsell | 0.4 |
| Autos-Car | Beta-Male | 2.7 |
| Autos-Truck | Beta-Male | 2.1 |
| Autos-Suv | Beta-Male | 1.2 |
| Autos-Pickup | Beta-Male | 1.9 |
| Autos-Used | Beta-Male | 0.8 |

Tables 8 indicates that the new contract is feasible, and that it is a favorable contract overall for maximizing site revenue—with only Acme's creatives, total revenue was $15,000. With revenue from both Acme and Beta, total revenue is $23,143.55.

TABLE 8

| | |
| --- | --- |
| Total Revenue | $ 23143.35 |
| Total Impressions Inventory | 3450000 |
| Total Impressions Inventory Sold | 3450000 |
| Total Clicks | 76399 |
| Contractually Guaranteed Clicks | 2000 |
| Contractually Guaranteed Impressions | 680555 |
| Total Impressions Unsold | 0 |
| Total Revenue Forfeited | 26857 |
| Num Clients | 2 |
| Num Contracts | 3 |
| Num Creatives | 4 |
| Num Placements in Site | 5 |
| Average CTR | 2.21% |
| Average Impression Worth (×1000) | $ 6.71 |
| Average Click-Through Worth | $ 0.30 |
| Average Spend per Client | $ 11,571.68 |
| Average Impressions Per Client | 1725000 |
| Average Clicks Per Client | 38199.7 |

Accordingly, the Beta contracts are worth accepting for the site, as they raise total revenue.

Figure 4:
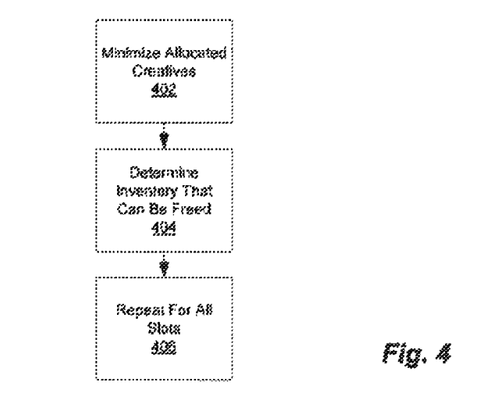
FIG. 4 is a flow chart illustrating a method for determining a maximum inventory of creatives that can be freed from a slot in accordance with an embodiment of the present invention.

In another embodiment, and referring now to FIG. 4, linear program solver 104 can determine how much inventory for a given slot can be made available while still satisfying all constraints given above. First, linear program solver 104 minimizes 402 the following function to minimize the inventory of slot i:

$$\sum_{k=1}^{n} [A(i, j_k) \cdot Inv(i)]$$

The result of the minimization is the minimum number of impressions of creatives $\{j_1, j_2, \ldots, j_n\}$ that must be allocated to slot i. Subtracting this amount from Inv(i) yields 404 the total number of impressions that can be sold from slot set i. After the minimum number of impressions for slot i is determined, it is possible to rerun the revenue optimization procedure (as described earlier) with the additional constraint that the number of impressions allocated to i are equal to the number determined here. However, note that this will be unlikely to yield as good revenue results since the number of impressions that can be sold in slot i is now artificially limited. Nonetheless, this is useful to know to see what the effects are of freeing slot i. The process can be repeated 406 across all slots to determine total inventory that can be freed on a slot-by-slot basis.

Freeing a slot as just described is not necessarily profitable, though it is a step towards creating a new contract. For example, if a third company, Charlie Company, wants to purchase impressions only for the Autos-Truck category, it is preferable to determine first how much of Autos-Truck can be sold. Once that is known, preferably the next step is to determine for how much the inventory should be sold in order to make the sale profitable.

Figure 5:
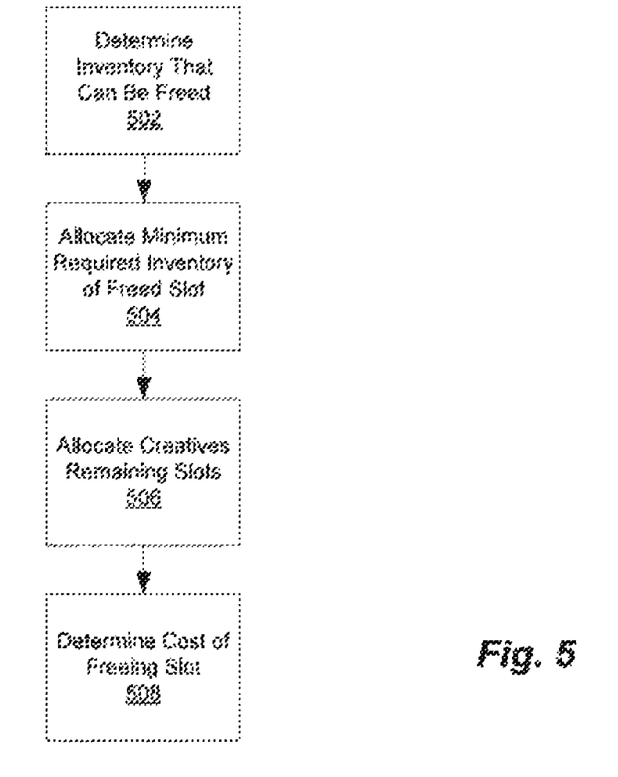
FIG. 5 is a flow chart illustrating a method for determining a cost of freeing a slot in accordance with an embodiment of the present invention.

In a preferred embodiment, system 100 determines a price for which the newly-freed slots must be sold in order to make the change profitable. First, and referring now to FIG. 5, a new constraint is added to free up 502 as much of a slot as possible, as described above, allocating 504 only the minimum required amount of the slot, represented as Min_Inv(i):

$$\sum_{k=1}^{n} [A(i, j_k) \cdot Inv(i)] \le \text{Min\_Inv}(i).$$

Creatives are allocated 506 to remaining slots as before, to produce an optimized return with respect to those slots. The expected revenue of this allocation schedule will be lower (or at most, equal) to the revenue of the originally optimized schedule, i.e. before the slot was freed up. The difference between the new expected revenue and the original expected revenue represents the revenue that must be made up for with new contracts in order to justify freeing up the slot. The ability to determine 508 this result using system 100 enables a site to quickly make decisions about forming new contracts, and is particularly useful where a site has multiple forms of advertisements. For example, a site that sells guaranteed advertising contracts and in addition also auctions some of its slots should always be aware of how much inventory can be freed up, e.g., to auction off. The methods described here make that complex determination feasible.

As will be appreciated by those of skill in the art, the analyses described above provide only estimates, subject to a degree of uncertainty. For example, inventory, click-through-rates and other variables are not usually known in advance, and thus introduce uncertainty into calculations made on the basis of the estimates. Accordingly, it is helpful in a preferred embodiment to select best and worst case scenarios in an effort to manage risk resulting from the inherent uncertainty of the data. Instead of only performing a maximization optimization with expected click-through-rates and expected inventory, a site owner may use a probability and an upper and lower bound associated with each estimate to determine a best and worst case expected revenue analysis. Alternatively, with an estimate of best and worst case click-through rates or transaction rates, the site owner can rerun the optimization analyses using these values to see how the resulting estimates vary.

The sensitivity of the allotment schedule can be determined by adjusting inventory numbers for each slot. For example, since many advertisers specify multiple slots for their creatives, if any individual slot is removed, the creatives allocated to that slot can typically be rescheduled, often with minimal impact on revenue. Note, however, that revenue will not increase, since the schedule was previously optimized. In some circumstances, certain high-value terms may be very sensitive, and removing or lowering their allocation could have a large impact on revenue.

In an alternative embodiment, a site operator wishes to maximize total number of clicks instead of total revenue. For example, a site that sells impressions for a fixed amount, or charges a constant amount for every click does not have to consider the amount an advertiser will pay for each click in the optimization process. Nonetheless, for reasons of good will, they may try to optimize the number of clicks that are generated. Accordingly, the function to maximize becomes:

$$\sum_{s=1}^{m}\sum_{k=1}^{n}[A(i_s, j_k) \cdot Inv(i_s) \cdot CTR(i_s, j_k)]$$

for all creatives $\{j_1, j_2, \ldots, j_n\}$ and all slots $\{i_1, i_2, \ldots, i_n\}$. This results in the maximum number of clicks by maximizing the clicks on all creatives in a slot across all slots.

Similarly, to maximize the expected number of transactions processed through clicked-on advertisements without regard to payment-per-transaction, the function to maximize becomes:

$$\sum_{s=1}^{m}\sum_{k=1}^{n}[A(i_s, j_k) \cdot Inv(i_s) \cdot FTR(i_s, j_k)]$$

for all creatives $\{j_1, j_2, \ldots, j_n\}$ and all slots $\{i_1, i_2, \ldots, i_m\}$.

On occasion, a site operator may want to offer a concession to an advertiser, for example to foster goodwill, make up for poor previous performance, etc. In a preferred embodiment, the operator can enter a concession amount either as a per-click concession amount, or as a total concession amount. The concession amount is then added to the appropriate expected revenue field for the advertiser for scheduling purposes, but not for revenue calculation purposes.

For example, if a first advertiser, Alpha, is willing to pay $2.00 per click, and advertiser Bravo is willing to pay $1.50 per click, system 100 would ordinarily favor allocation of slots to Alpha. Assume, however, that the site operator wishes to provide a $0.60 per click concession to Bravo. This means that for scheduling purposes, system 100 will treat Bravo as though it were prepared to pay $2.10 per click, thus allocating to it more favorably than to Alpha. For expected revenue purposes, however, system 100 uses the $1.50 per click that will actually be received from Bravo. Note, of course, that this results in less revenue than the pure optimization method described above, but is perfectly reasonable for a site operator to do in order to maximize long-term profitability—losing Bravo as a customer, for example, may ultimately lead to a significant loss in revenue. Accordingly, system 100 helps site operators account for these types of externalities.

In one embodiment, a site operator may wish to maximize the number of clicks received for a particular advertiser's creatives. For example, a site operator may be concerned about a client relationship with a particular advertiser, and want to alter the regular optimized allocation so that the advertiser gets more clicks, and has a higher degree of satisfaction in its relationship with the site operator. System 100 can be used to optimize the overall clicks for a client's creatives as follows, by maximizing the function:

$$\sum_{s=1}^{m}\sum_{k=1}^{n}[A(i_s, j_k) \cdot Inv(i_s) \cdot CTR(i_s, j_k)]$$

where $\{i_1, i_2, \ldots, i_m\}$ is the set of all slots and $\{j_1, j_2, \ldots, j_n\}$ is the set of all creatives for the advertiser in question. Since the set includes only those creatives belonging to the advertiser, it is the advertiser that receives the benefit of the optimization by having its creatives clicked on most often. Note again that the set of constraints remains in effect, insuring that guarantees made to the other advertisers are still met, while optimizing for the particular advertiser or set of advertisers. Those of skill in the art will appreciate that optimization such as this can be performed for one or more advertisers, depending on the creatives included in the set j.

System 100 also has application to an environment in which advertisements are being scheduled on more than one site. For example, an advertising intermediary may be responsible for purchasing advertising space for an advertising client from among a variety of sites. In one embodiment, a slot includes a site component, and thus optimizing an allocation for number of clicks for an advertiser across all possible sites is easily performed by system 100.

In an alternative embodiment, advertisements are managed for a large portfolio of clients, which may be separate advertisers, or different business units of a single advertiser, etc., in such a manner as to ensure that the allocated impressions do not have the clients competing against one another. For example, by having an advertising agency perform an optimization specific to its own clients and then submitting each of their bids to the site, the advertisers will not be competing within the site's system and artificially raising each other's auction bids. Instead, the advertising agency can schedule a first client for some words, a second client for some other words, and a third client for an entirely different set of words—therefore ensuring that the clients are not bidding against each other. Since the agency has knowledge of the competing clients' bids, they have the opportunity to ensure that they do not compete against each other, but only against advertisers from outside the agency.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the linear program solver 104 and so forth may be provided in many or one module. Additionally, if more complex constraints are required, other problem solvers can be used, e.g., integer programming or quadratic solvers.

Some portions of the above description present the feature of the present invention in terms of algorithms and symbolic representations of operations on information. These algorithmic descriptions and representations are the means used by those skilled in the online advertising arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality. It should be borne in mind, however, that all of these and similar terms are to be associated with the appropriate physical quantities and are merely convenient labels applied to these quantities.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

I claim:

1. A method, comprising:
    assigning, to an existing advertiser, a set of future impressions that are available over a specified period, wherein assignment of a future impression to an advertiser reserves the impression for presentation of an advertisement for the advertiser when a time of the future impression is reached;
    obtaining, by a computer, proposed offer data from a candidate advertiser that is different than the existing advertiser, the proposed offer data requesting distribution of a first set of advertisements according to first allocation constraints, the first allocation constraints specifying a maximum price that the candidate advertiser will pay for distribution of the first set of advertisements;
    obtaining, by a computer, allocation data for the existing advertiser, the allocation data specifying second allocation constraints indicative of a minimum number of impressions that must be reserved for the existing advertiser;
    determining, by a computer, that the set of future impressions includes more than the minimum number of impressions that are required to be reserved for the existing advertiser;
    determining, by a computer and based on the proposed offer data and the allocation data, that:
        re-assignment of a portion of the set of future impressions, from the existing advertiser to the candidate advertiser, will increase total revenue generated by assignment of future impressions; and
        after the re-assignment, at least the minimum number of impressions from the set of future impressions will remain reserved for the candidate advertiser; and
    in response to the determination, re-assigning, by a computer and in accordance with the first allocation constraints, at least some of the portion of the set of future impressions from the existing advertiser to the candidate advertiser, the re-assignment being performed without violating the second allocation constraints.

2. The method of claim 1, further comprising:
    obtaining an estimated number of future impressions that will be available with a publisher property;
    determining, based on the proposed offer data, the estimated number of future impressions, and the set of future impressions, that at least a portion of the set of future impressions must be re-assigned in order to satisfy requirements of the first allocation constraints; and
    distributing, according to the re-assignment, advertisements from each of the existing advertiser and the candidate advertiser for presentation with the publisher property.

3. The method of claim 2, wherein determining that at least a portion of the set of future impressions must be re-assigned comprises determining that the first allocation constraints require assignment, to the candidate advertiser, of an amount of the future impressions that exceeds a remaining portion of the estimated number of future impressions that are not included in the set of future impressions.

4. The method of claim 1, further comprising:
    receiving the second allocation constraints, wherein the second allocation constraints include a maximum budget for the existing advertiser;
    determining, based on the second allocation constraints, that a portion of the budget required to provide the minimum number of impressions to the existing advertiser is less than the maximum budget; and in response to determining that the portion of the budget is less than the maximum budget, assigning more than the minimum number of impressions to the existing advertiser.

5. The method of claim 4, wherein the second allocation constraints specify that less than a particular portion of the maximum budget is to be spent on assignments of demographically targeted future impressions, the demographically targeted future impressions being a portion of the future impressions that is presented to users that are part of a specified demographic group.

6. The method of claim 1, wherein re-assigning at least some of the portion of the set of future impressions comprises:
   determining, based on the second allocation constraints, a minimum portion of the set of future impressions that must remain assigned to the existing advertiser in order to satisfy the second allocation constraints;
   identifying, based on the set of future impressions and the minimum portion, available future impressions that are not included in the minimum portion of the set of future impressions; and
   re-assigning, to the candidate advertiser, at least a portion of the available future impressions.

7. The method of claim 6, further comprising determining that at least a portion of the available future impressions satisfies the first allocation constraints, wherein the re-assigning is further performed in response to determining that at least a portion of the available future impressions satisfies the first allocation constraints.

8. The method of claim 6, wherein the first allocation constraints require that the candidate advertiser be assigned demographically targeted future impressions, the demographically targeted future impressions being a portion of the future impressions that is presented to users that are part of a specified demographic group.

9. The method of claim 6, wherein determining that re-assignment of a portion of the set of future impressions, from the existing advertiser to the candidate advertiser, will increase the total revenue comprises determining that current revenue generated by the available future impressions is less than proposed revenue that will be generated by re-assigning, to the candidate advertiser, at least a portion of the available future impressions.

10. The method of claim 1, wherein determining that after the re-assignment, at least the minimum number of impressions from the set of future impressions will remain reserved for the candidate advertiser comprises:
   determining, based on the first allocation constraints, a first number of future impressions that is required to be reserved for the candidate advertiser;
   determining, based on the second allocation constraints, a second number of future impressions that is required to be reserved for the existing advertiser; and
   determining that there is a sufficient number of future impressions to reserve both the first number of future impressions for the candidate advertiser and the second number of future impressions for the existing advertiser.

11. The method of claim 10, wherein determining that the re-assignment of a portion of the set of future impressions, from the existing advertiser to the candidate advertiser, will increase total revenue generated by assignment of future impressions further comprises determining that proposed revenue generated by assigning both the first number of future impressions to the candidate advertiser and the second number of future impressions to the existing advertiser is greater than current revenue generated by the set of future impressions.

12. The method of claim 1, further comprising determining a number of the future impressions to be re-assigned from the existing advertiser to the candidate advertiser, the determination being constrained by the second allocation constraints.

13. The method of claim 12, wherein determining a number of the future impressions to be re-assigned comprises:
   determining, based on the first allocation constraints, a first number of future impressions that is required to be reserved for the candidate advertiser;
   determining, based on the second allocation constraints, a second number of the future impressions that is required to be reserved for the existing advertiser;
   determining, based on the first number, the second number, and an estimated number of the future impressions, that a portion of the set of future impressions must be re-allocated to the candidate advertiser to satisfy the first allocation constraints; and
   selecting the portion of the set of future impressions as the portion of the number future impressions to be re-assigned.

14. The method of claim 13, wherein determining a number of the future impressions to be re-assigned further comprises:
   determining that re-assignment of an additional portion of the set of future impressions to the candidate advertiser increases proposed revenue without violating the second allocation constraints; and
   including the additional portion of the set of future impressions in the number of future impression to be re-assigned.

15. The method of claim 13, wherein:
   the first allocation constraints require that one or more advertisements in the first the candidate advertiser be allocated one or more demographically targeted future impressions, the demographically targeted future impressions being a portion of the future impressions that is presented to users that are part of a specified demographic group; and
   the portion of the set of future impressions that is re-assigned to the candidate advertiser includes the demographically targeted future impressions.

16. A system comprising:
   one or more computers; and
   a storage device communicatively coupled to the one or more computers, the storage device storing instructions, that upon execution by the one or more computers, cause the one or more computers to perform operations including:
      assigning, to an existing advertiser, a set of future impressions that are available over a specified period, wherein assignment of a future impression to an advertiser reserves the impression for presentation of an advertisement for the advertiser when a time of the future impression is reached;
      obtaining proposed offer data from a candidate advertiser that is different than the existing advertiser, the proposed offer data requesting distribution of a first set of advertisements according to first allocation constraints, the first allocation constraints specifying a maximum price that the candidate advertiser will pay for distribution of the first set of advertisements;
      obtaining allocation data for the existing advertiser, the allocation data specifying second allocation constraints indicative of a minimum number of impressions that must be reserved for the existing advertiser;
      determining that the set of future impressions includes more than the minimum number of impressions that are required to be reserved for the existing advertiser;
      determining, based on the proposed offer data and the allocation data, that:
         re-assignment of a portion of the set of future impressions, from the existing advertiser to the candidate advertiser, will increase total revenue generated by assignment of future impressions; and after the re-assignment, at least the minimum number of impressions from the set of future impressions will remain reserved for the candidate advertiser; and in response to the determination, re-assigning, by a computer and in accordance with the first allocation constraints, at least some of the portion of the set of future impressions from the existing advertiser to the candidate advertiser, the re-assignment being performed without violating the second allocation constraints.

17. The system of claim 16, wherein the instructions further cause the one or more computers to perform operations including:

obtaining an estimated number of future impressions that will be available with a publisher property;

determining, based on the proposed offer data, the estimated number of future impressions, and the set of future impressions, that at least a portion of the set of future impressions must be re-assigned in order to satisfy requirements of the first allocation constraints; and distributing, according to the re-assignment, advertisements from each of the existing advertiser and the candidate advertiser for presentation with the publisher property.

18. The system of claim 17, wherein determining that at least a portion of the set of future impressions must be re-assigned comprises determining that the first allocation constraints require assignment, to the candidate advertiser, of an amount of the future impressions that exceeds a remaining portion of the estimated number of future impressions that are not included in the set of future impressions.

19. The system of claim 16, wherein the instructions further cause the one or more computers to perform operations including:

receiving the second allocation constraints, wherein the second allocation constraints include a maximum budget for the existing advertiser;

determining, based on the second allocation constraints, that a portion of the budget required to provide the minimum number of impressions to the existing advertiser is less than the maximum budget; and in response to determining that the portion of the budget is less than the maximum budget, assigning more than the minimum number of impressions to the existing advertiser.

20. The system of claim 19, wherein the second allocation constraints specify that less than a particular portion of the maximum budget is to be spent on assignments of demographically targeted future impressions, the demographically targeted future impressions being a portion of the future impressions that is presented to users that are part of a specified demographic group.

21. The system of claim 16, wherein re-assigning at least some of the portion of the set of future impressions comprises:

determining, based on the second allocation constraints, a minimum portion of the set of future impressions that must remain assigned to the existing advertiser in order to satisfy the second allocation constraints;

identifying, based on the set of future impressions and the minimum portion, available future impressions that are not included in the minimum portion of the set of future impressions; and re-assigning, to the candidate advertiser, at least a portion of the available future impressions.

22. The system of claim 16, wherein determining that after the re-assignment, at least the minimum number of impressions from the set of future impressions will remain reserved for the candidate advertiser comprises:

determining, based on the first allocation constraints, a first number of future impressions that is required to be reserved for the candidate advertiser;

determining, based on the second allocation constraints, a second number of future impressions that is required to be reserved for the existing advertiser; and determining that there is a sufficient number of future impressions to reserve both the first number of future impressions for the candidate advertiser and the second number of future impressions for the existing advertiser.

23. The system of claim 22, wherein determining that the re-assignment of a portion of the set of future impressions, from the second existing advertiser to the candidate advertiser, will increase total revenue generated by assignment of future impressions further comprises determining that proposed revenue generated by assigning both the first number of future impressions to the candidate advertiser and the second number of future impressions to the existing advertiser is greater than current revenue generated by the set of future impressions.

24. The system of claim 16, wherein the instructions further cause the one or more computers to perform operations including determining a number of the future impressions to be re-assigned from the existing advertiser to the candidate advertiser, the determination being constrained by the second allocation constraints.

25. The system of claim 24, wherein determining a number of the future impressions to be re-assigned comprises:

determining, based on the first allocation constraints, a first number of future impressions that is required to be reserved for the candidate advertiser;

determining, based on the second allocation constraints, a second number of the future impressions that is required to be reserved for the existing advertiser;

determining, based on the first number, the second number, and an estimated number of the future impressions, that a portion of the set of future impressions must be re-allocated to the candidate advertiser to satisfy the first allocation constraints; and selecting the portion of the set of future impressions as the portion of the number future impressions to be re-assigned.

26. The system of claim 25, wherein determining a number of the future impressions to be re-assigned further comprises:

determining that re-assignment of an additional portion of the set of future impressions to the candidate advertiser increases proposed revenue without violating the second allocation constraints; and including the additional portion of the set of future impressions in the number of future impression to be re-assigned.

27. The system of claim 25, wherein:

the first allocation constraints require that the candidate advertiser be allocated one or more demographically targeted future impressions, the demographically targeted future impressions being a portion of the future impressions that is presented to users that are part of a specified demographic group; and the portion of the set of future impressions that is re-assigned to the candidate advertiser includes the demographically targeted future impressions.

* * * * *

UNITED STATES PATENT AND TRADEMARK OFFICE
CERTIFICATE OF CORRECTION

PATENT NO. : 8,407,091 B2
APPLICATION NO. : 13/494214
DATED : March 26, 2013
INVENTOR(S) : Shumeet Baluja It is certified that error appears in the above-identified patent and that said Letters Patent is hereby corrected as shown below:

Title Page, Column 2, Line 1 (Other Publications) – delete "Department" and insert -- Departement --, therefor.

In the Claims

Claim 13, Column 16, Line 18 – delete "number" and insert -- number of --, therefor.

Claim 15, Column 16, Line 29-30 – delete "that one or more advertisements in the first" and insert -- that --, therefor.

Claim 23, Column 18, Line 16 – delete "the second" and insert -- the --, therefor.

Claim 25, Column 18, Line 42 – delete "number" and insert -- number of --, therefor.

Signed and Sealed this
Sixteenth Day of July, 2013

Teresa Stanek Rea
*Acting Director of the United States Patent and Trademark Office*